June 5, 1956  W. J. GORENFLO  2,749,067
SUPPORT FOR FISHING ROD
Filed July 29, 1952
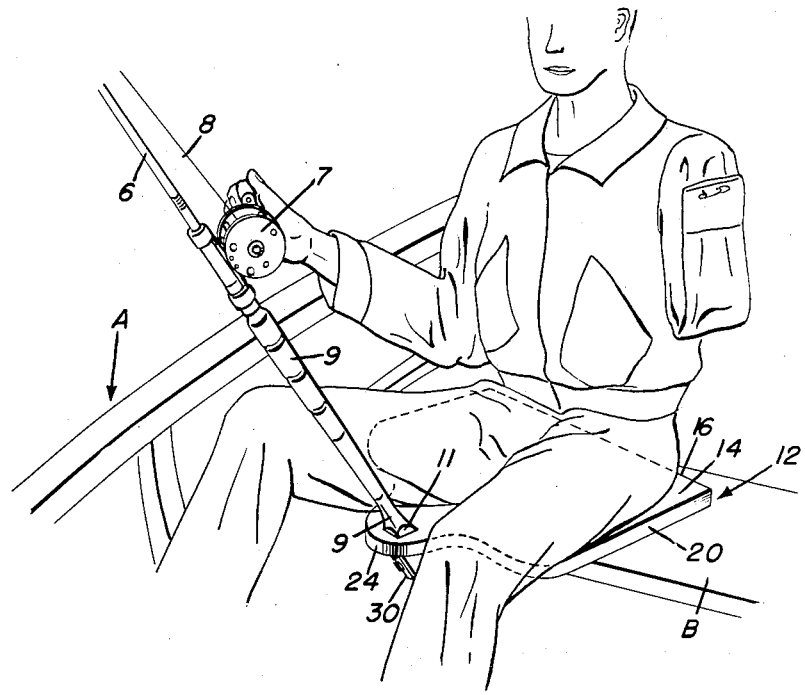
Fig. 1
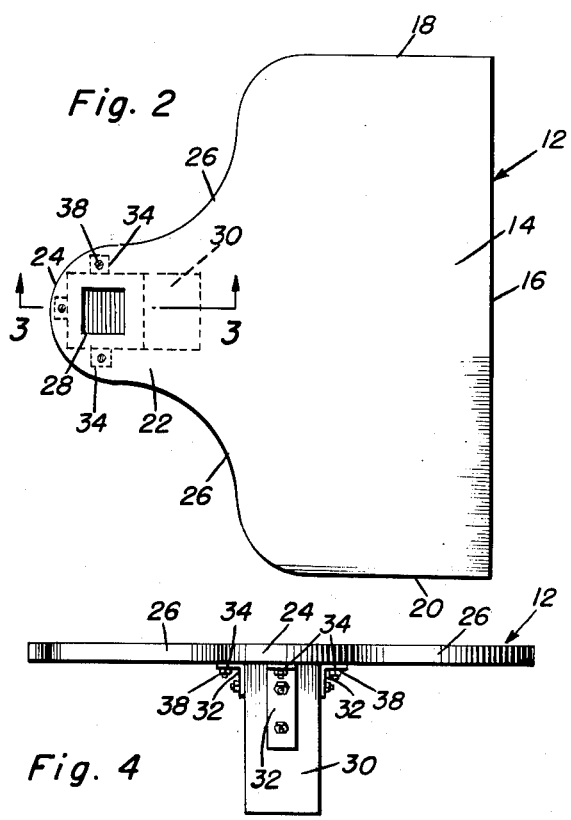
Fig. 2
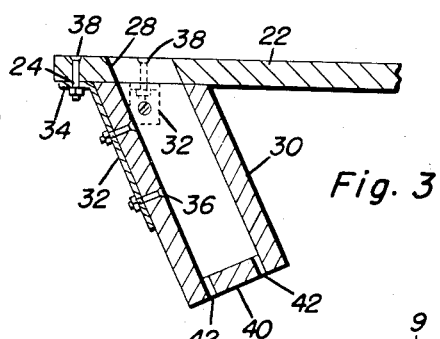
Fig. 3
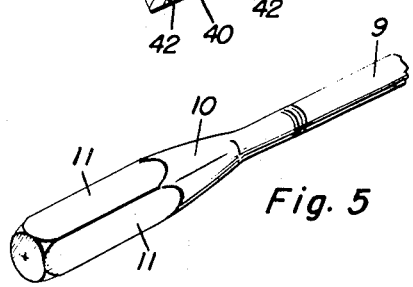
Fig. 5
Fig. 4
Wilfred J. Gorenflo
INVENTOR.
BY *Clarence A. O'Brien*
*and Harvey B. Jacobson*
Attorneys United States Patent Office 2,749,067
Patented June 5, 1956

2,749,067

SUPPORT FOR FISHING ROD

Wilfred J. Gorenflo, Biloxi, Miss.

Application July 29, 1952, Serial No. 301,537

1 Claim. (Cl. 248—42)

The present invention relates to a fishing rod and a novel support and holder therefor wherein the rod is provided with a specially constructed handle and the support is portable and provided with novel means for anchoring and holding the handle so that the rod asumes and retains a satisfactory fishing angle.

It is a matter of common knowledge that amputees having one arm and other handicapped persons having one arm paralyzed and those with similar physical handicaps seldom resort to fishing as a recreation. Confronted with this given problem an acceptable solution has been worked out. The result desired is attained through the medium of a simple, practical and economical mechanical aid, which latter takes the form of a satisfactory rod support and retainer so that the user who has at least a single usable hand may participate as a fisherman.

One object of the invention, structurally speaking, is to provide a fishing rod whose handle is so made that it may be removably anchored and held against rotation on an appropriate support and in such a way that the rod may be sustained at a correct fishing angle for one-handed use.

Another object of the invention has to do with special supporting and holding means for the stated rod, said means being characterized primarily by a socket member or the like in which the aforementioned handle is telescopedly fitted.

More specifically, the support and holding means takes the form of a base, one which is so constructed that it also functions as a seat, the forward edge portion thereof having an extension which is straddled by the legs of the user, and said extension carrying the depending appropriately inclined socket member.

It is a further object of the invention to provide a socket member which is polygonal in cross-section to receive a handle of corresponding cross-section and wherein the bottom of the socket is apertured to provide drainage openings.

Other features and advantages, not specifically mentioned above, will doubtless become apparent from the following detailed description, claim and drawings.

In the accompanying sheet of drawings wherein like numerals are employed to designate like parts throughout the views:

Figure 1 is a fragmentary perspective view showing the support and holder, fishing rod with the improved handle and the manner in which the assemblage is commonly used;

Figure 2 is a top plan view of the rod receiving and holding base with the rod removed therefrom;

Figure 3 is an enlarged fragmentary sectional view taken on the plane of the line 3—3 of Figure 2 looking in the direction of the arrows;

Figure 4 is a front edge elevation of the base appearing in Figure 2 observing the structure in a direction from left to right; and, Figure 5 is a fragmentary perspective view showing the improved fishing rod handle.

In Figure 1 the letter A denotes a rowboat or the like and B denotes the usual seat. The invention does not have to be used on a rowboat, as a matter of fact, it may be used on the edge of a pier, on a fishing bank or elsewhere. The fishing rod is denoted by the numeral 6, the reel at 7 and the line at 8. The handle is denoted at 9 and the improved feature is the enlarged and sturdy butt end 10. This is polygonal in cross-section and in here shown as square in cross-section with the flat faces denoted by the numeral 11. Although this type of butt could perhaps be used with some other clamp or support than specifically shown, it is preferably employed in conjunction with the support means illustrated. This means is referred to broadly as a base 12. It comprises a flat board or panel 14 having a straight rearward edge 16 and straight right-angularly disposed marginal edges 18 and 20. On the forward edge is a relatively narrow extension 22 having a rounded end portion 24 and this merges into the forward edge by way of the curvate portions 26—26. The extension has an opening 28 therein, as best shown in Figure 3, and for the most part the opening will be square. Attached to the underside of the extension depending therefrom, is an oblique-angled receiver or socket member 30. This is lined up with the opening 28 and clips 32 having lateral end portions 34 are fastened in place as at 36, the lateral end portions engaging the underside of the extension and being fastened thereto as at 38. The bottom of the socket member 40 is provided with drainage holes 42 so that any water which may be trapped in the socket member will be discharged in an obvious manner. The angularity of the socket member, with respect to the horizontal plane of the base, is gaged to support and retain the fishing rod in a natural angular fishing position, for example that revealed in Figure 1.

In ordinary use the base serves as a hold-down seat. It is placed on the seat B, as shown, and the user occupies it in the manner illustrated. The legs of the user straddle the extension 22. The polygonal butt end of the rod handle is fitted telescopically into the socket member where it is held against rotation but is removable so that it may be yanked out whenever necessary or desired to enable the user to land his catch. Here then is a holder and rod assembly which may be adequately and satisfactorily used by handicapped individuals in the category hereinbefore mentioned.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

For use by a fisherman handicapped by having but a single arm available for handling his fishing equipment, an essentially imperforate seat board of an area to permit a user to sit comfortably thereon and having substantially flat top and bottom surfaces, said top surface being wholly free of obstructions and said bottom surface being adapted to be positioned, when in use, on a relatively stationary boat seat or the like, and wherein the board then provides a portable seat on which the user may sit in a manner to utilize his own weight as the sole means of holding the board in a given position on the boat seat, the forward marginal edge of said seat board being provided with a centrally arranged forwardly projecting relatively narrow extension which is adapted to be straddled by the user's legs, said extension having an opening therein, and a socket member attached to and depending below the bottom side of said extension and aligned with said opening, said socket member being essentially closed at its bottom and inclining rearwardly beneath the extension and being non-circular in cross-section to accommodate the insertable and removable non-circular end portion of a fishing rod.

References Cited in the file of this patent

UNITED STATES PATENTS

| | | |
|---|---|---|
| 332,917 | Markham | Dec. 22, 1885 |
| 412,479 | Davis | Oct. 8, 1889 |
| 965,826 | Lynch | July 26, 1910 |
| 981,631 | Fraser | Jan. 17, 1911 |
| 1,223,884 | Johnstone | Apr. 24, 1917 |
| 1,985,985 | Gerline | Jan. 1, 1935 |
| 2,455,606 | Pleiss | Dec. 7, 1948 |
| 2,499,117 | Smith | Feb. 28, 1950 |

FOREIGN PATENTS

| | | |
|---|---|---|
| 264,704 | Great Britain | Jan. 27, 1927 |